United States Patent
Frommann

(10) Patent No.: US 9,139,233 B2
(45) Date of Patent: Sep. 22, 2015

(54) MOTOR VEHICLE COCKPIT WITH AN INSTRUMENT UNIT AND A SHADOW REGION

(71) Applicant: GM GLOBAL TECHNOLOGY OPERATIONS LLC, Detroit, MI (US)

(72) Inventor: Markus Frommann, Bingen am Rhein (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/097,748

(22) Filed: Dec. 5, 2013

(65) Prior Publication Data

US 2014/0191530 A1    Jul. 10, 2014

(30) Foreign Application Priority Data

Dec. 6, 2012 (DE) .......................... 10 2012 023 941

(51) Int. Cl.
*B62D 25/14* (2006.01)
*B60K 37/00* (2006.01)
*B60K 37/02* (2006.01)

(52) U.S. Cl.
CPC ............... *B62D 25/14* (2013.01); *B60K 37/00* (2013.01); *B60K 37/02* (2013.01)

(58) Field of Classification Search
CPC ...... B62D 25/145; B62D 65/04; B62D 65/14; B60K 35/00; B60K 37/00; G10H 2220/411; G10H 3/06; G10H 3/18; G06T 2207/30004; G01N 1/32

USPC ........... 296/70, 193.02, 72; 180/90; 356/638; 345/7; 368/223

See application file for complete search history.

(56) References Cited

U.S. PATENT DOCUMENTS

| | | | | | |
|---|---|---|---|---|---|
| 3,899,241 | A | * | 8/1975 | Malobicky et al. | 359/630 |
| 4,832,287 | A | * | 5/1989 | Werjefelt | 244/118.5 |
| 4,961,625 | A | * | 10/1990 | Wood et al. | 359/630 |
| 4,988,976 | A | * | 1/1991 | Lu | 340/461 |
| 5,013,135 | A | * | 5/1991 | Yamamura | 359/630 |
| 5,128,659 | A | * | 7/1992 | Roberts et al. | 345/7 |
| 5,440,428 | A | | 8/1995 | Hegg et al. | |
| 5,657,161 | A | * | 8/1997 | Melograne | 359/488.01 |
| 5,805,119 | A | * | 9/1998 | Erskine et al. | 345/7 |
| 5,821,867 | A | * | 10/1998 | Angell et al. | 340/815.45 |
| 6,042,239 | A | * | 3/2000 | Liepmann et al. | 359/601 |

(Continued)

FOREIGN PATENT DOCUMENTS

| | | |
|---|---|---|
| DE | 10024232 A1 | 11/2001 |
| EP | 1400392 A2 | 3/2004 |

(Continued)

OTHER PUBLICATIONS

German Patent Office, German Patent Search Report for Application No. 102012023941.6, dated Jul. 15, 2013.

*Primary Examiner* — Kiran B Patel

(74) *Attorney, Agent, or Firm* — Ingrassia Fisher & Lorenz PC

(57) ABSTRACT

A motor vehicle cockpit is provided that includes, but is not limited to, an instrument unit with an instrument, an at least partially transparent cover arranged on the instrument unit, a shadow region, which is arranged relative to the cover so that the shadow region is mirrored in the cover viewed from a driver's eye. The shadow region is closed on a side facing the driver's eye.

11 Claims, 3 Drawing Sheets

(56) References Cited

U.S. PATENT DOCUMENTS

| | | | | |
|---|---|---|---|---|
| 6,322,122 B2* | 11/2001 | Burns et al. | ................... | 296/24.3 |
| 6,695,374 B1* | 2/2004 | Gebreselassie et al. | ..... | 296/24.3 |
| 6,756,004 B2* | 6/2004 | Davis et al. | ................... | 264/255 |
| 6,920,234 B1* | 7/2005 | Koenig et al. | ................. | 382/103 |
| 6,974,172 B2* | 12/2005 | Gebreselassie et al. | ..... | 296/39.3 |
| 7,511,683 B2* | 3/2009 | Sumiyoshi | ........................ | 345/7 |
| 8,675,283 B2* | 3/2014 | Fujikawa et al. | ............. | 359/630 |
| 8,760,766 B2* | 6/2014 | Fujikawa | ...................... | 359/630 |
| 2004/0228139 A1* | 11/2004 | Taniuchi | ....................... | 362/539 |
| 2006/0039129 A1* | 2/2006 | Coghlan et al. | ................. | 362/23 |
| 2007/0017790 A1* | 1/2007 | Slave et al. | ................. | 200/61.02 |
| 2007/0127811 A1* | 6/2007 | Luo | ................................ | 382/159 |
| 2008/0211652 A1* | 9/2008 | Cope et al. | .................... | 340/461 |
| 2009/0027332 A1* | 1/2009 | Cieler et al. | ................... | 345/156 |

FOREIGN PATENT DOCUMENTS

| | | |
|---|---|---|
| GB | 1452403 | 10/1976 |
| WO | 9204202 A1 | 3/1992 |

\* cited by examiner

MOTOR VEHICLE COCKPIT WITH AN INSTRUMENT UNIT AND A SHADOW REGION

CROSS-REFERENCE TO RELATED APPLICATION

This application claims priority to German Patent Application No. 10 2012 023 867.3, filed Dec. 6, 2012, which is incorporated herein by reference in its entirety.

TECHNICAL FIELD

The technical field relates to a motor vehicle cockpit of a motor vehicle, with an instrument unit, which comprises at least one instrument and one cover.

BACKGROUND

An instrument unit is known from U.S. Pat. No. 5,440,428. The cover is arranged in front of the instrument. Directly in front of the cover is a darkened area, which is arranged so that the eye of the driver only sees reflections of this darkened area. Because of this, interfering light influences can be largely avoided.

In view of the foregoing, at least one object is to largely exclude interfering light influences. In addition, other objects, desirable features and characteristics will become apparent from the subsequent summary and detailed description, and the appended claims, taken in conjunction with the accompanying drawings and this background.

SUMMARY

Accordingly, a motor vehicle cockpit is provided, comprising: an instrument unit with at least one instrument, an at least partially transparent cover which is arranged on the instrument unit, a shadow region, which is arranged relative to the cover so that the shadow region is mirrored in the cover viewed from a driver's eye. The shadow region is closed on a side facing the driver's eye.

In the instrument unit, instruments such as for example a speedometer, a tachometer, a display and various pilot lamps can be arranged. During operation, these should be always visible at least to the driver. The instruments, which partly comprise moveable elements such as for example analogue pointers, are protected from dust, liquids and from mechanical effects during the assembly and during the operation through the cover. Here, the cover is arranged so that it is not perceived by the driver. This is achieved in that invisible to the driver the shadow region is mirrored in the cover. The shadow region is also covered on the side facing the driver and thus dark even upon lateral incidence of light. The instrument unit can for example be a speedometer unit arranged in the cockpit or a multimedia display arranged in the center of the vehicle.

In a configuration, the instrument unit is arranged on an instrument panel, wherein the shadow region is arranged on a steering column cover. The steering column cover is arranged in the immediate vicinity of the instrument unit in particular directly below it. The instrument unit can be embodied flatter, since in the configuration mentioned in the preceding paragraph the shadow region is arranged in a space above a steering column which is not usually utilized, which connects a steering wheel to a steering gear.

In a configuration, the shadow region is arranged in the instrument unit. In this configuration, the speedometer unit can be delivered and assembled already completed with the shadow region. In a further configuration, the shadow region is arranged in an assembly strip arranged in front of the instrument unit. Accordingly, the shadow region is assembled together with the assembly strip after the assembly of the instrument unit.

In a configuration, the cover is curved about a vehicle transverse axis. Accordingly, the cover is concavely curved in a section which is located parallel to a plane through the instrument unit that is defined by the vehicle vertical axis and the vehicle longitudinal axis. Through the concave curvature or the curvature about the vehicle transverse axis, the shadow region can be embodied shortened in the vehicle longitudinal axis, since the cover focuses the light rays onto the shadow region. Accordingly, the shadow region can also be embodied narrower in the vehicle transverse axis. In a further configuration, the cover is inclined towards the bottom.

An imaginary straight line running orthogonally to the cover accordingly faces along the vehicle longitudinal axis to the rear, i.e., in negative X-direction and downwards in the vehicle vertical axis, i.e., in negative Z-direction. Interfering light influences are further reduced since at least the light from the surroundings with the arrangement of the instrument unit in front of the driver always shines onto the instrument panel or onto the closed side of the shadow region from the top or from the side.

In the configuration, the shadow region is tinted black. The black tint provides for an increased absorption of entering light and additionally for a lower reflection of light within the shadow region. The shadow region can always be tinted black even in vehicles which at the customer's request are equipped with an interior trim which is otherwise kept in bright colors. Therefore, the shadow region can be darkened further.

In a further configuration, the shadow region comprises a light-absorbing surface. The light-absorbing surface ensures a reduced light reflection within the shadow region. Because of this reduced light reflection, interfering light reflections can be further reduced. For example velvet can be used for this purpose, which has a high light absorption capacity. The velvet can be dyed black.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
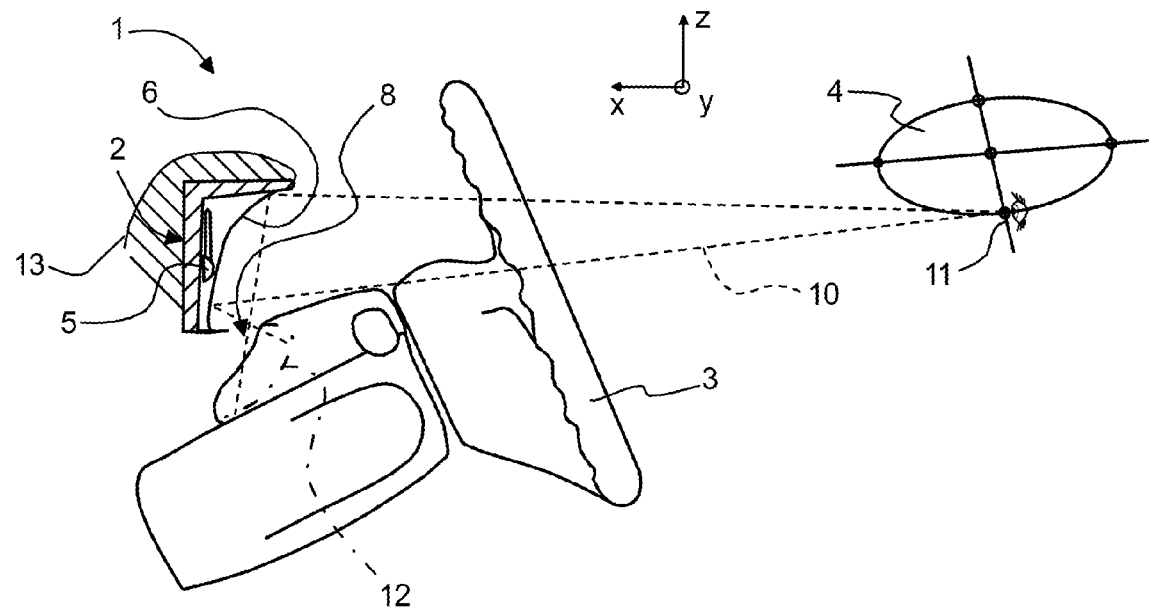
FIG. 1 is schematically from a lateral perspective, a cockpit of a motor vehicle with an instrument panel, a steering column cover and a steering wheel.

FIG. 1 schematically shows from a lateral perspective a part of a vehicle cockpit 1 with an instrument unit 2 arranged in an instrument panel 13 and a steering wheel 3. The instrument unit 2 is at least well visible by an eye ellipse 4, in which an exemplarily shown driver's eye 11 of drivers with different sizes and different setting positions can be located. The instrument unit 2 comprises an instrument 5. The instrument 5 is arranged in the instrument unit 2 protected from dust and dirt by a transparent cover 6. The cover 6 is inclined towards the bottom. Directly next to the instrument unit 2, a steering column cover 7 is arranged. On a side 8 of the steering column cover 7 facing the instrument unit 2, a shadow region 9 is arranged.

The shadow region 9 is mirrored, invisible to the driver, in the cover 6. The cover 6 is curved, i.e., concavely formed about a vehicle vertical axis Z and about a vertical transverse axis Y. Light rays 10, which are reflected by the shadow region 9 in the cover 6 and are not visible to the driver, since the shadow region is dark, are focused onto the shadow region 9 by the curvature. The shadow region 9 is also covered on a side 12 facing the driver's eye 11. Because of this, the shadow region 9 is almost completely darkened, since at least no direct light rays can enter the shadow region from the outside. The reflection of the shadow region 9 in the cover 6 is thus not visible to the driver, as a result of which the transparent cover 6 is also hardly visible. The shadow region 9 is also closed on the side 8 facing the instrument unit 2, so that light entering from the top, i.e. against a vehicle vertical axis Z, does not brighten up the shadow region 9 either. Because of this, the instrument 5 is always well visible from the eye ellipse 4.

Figure 2:
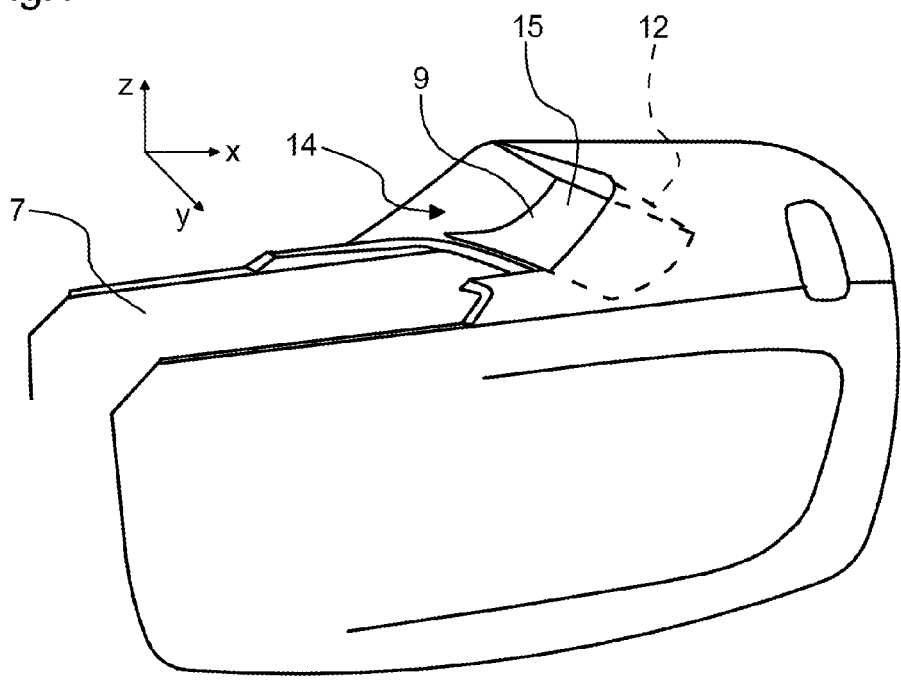
FIG. 2 is a steering column cover with a shadow region.

FIG. 2 shows the steering column cover 7 in the disassembled state. One can see a depression 14, in which the shadow region 9 is arranged. The shadow region 9 is preferentially tinted black in a manner which is not shown and has a mat surface 15. This can be formed of velvet. The shadow regions 9' and 9" shown in the remaining figures can also be lined with velvet. The steering column cover 7 serves for covering a steering column which is not shown in the figures, which provides a mechanical connection between the steering wheel 3 and a steering gear which is not shown.

Figure 3:
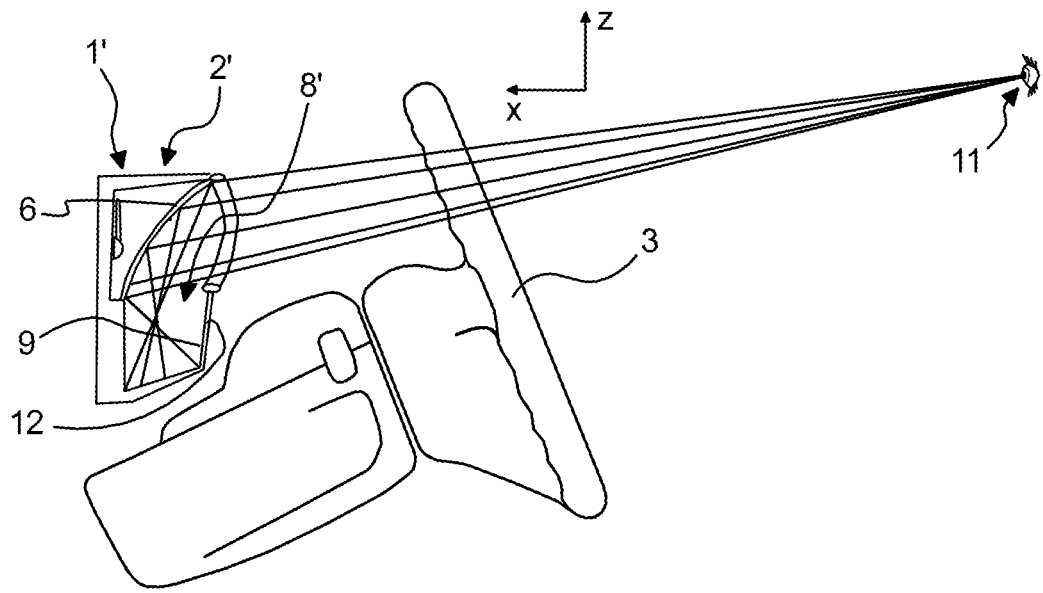
FIG. 3 is schematically from a lateral perspective, a cockpit of a motor vehicle with an instrument panel and with a speedometer housing, in which an instrument unit with a cover and a shadow region is integrated.

FIG. 3 schematically shows from a lateral perspective an instrument unit 2' with an instrument 5 and a cover 6 located directly in front of the latter. On the instrument unit 2', a shadow region 9 is formed. The shadow region 9' is mirrored in the cover 6 in the manner described above. In that the shadow region 9' is only opened on a side 8' facing the instrument unit 2', no direct light can enter the shadow region 9' from the side. Because of this, the shadow region 9' is not visible to the driver's eye 11, so that no interfering reflections stand out in the cover 6.

Figure 4:
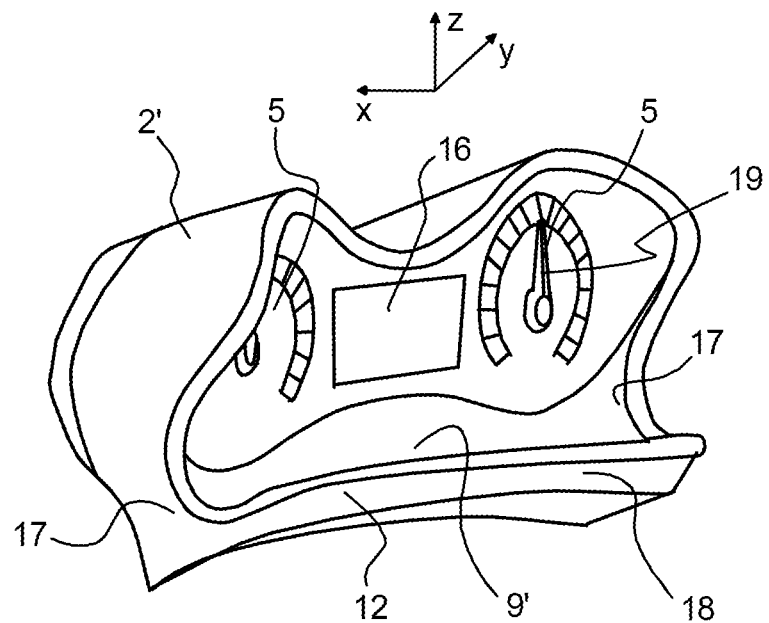
FIG. 4 is schematically in a perspective representation, a speedometer housing with two analogue instruments and a display.

FIG. 4 shows the instrument unit 2' shown in FIG. 3 from a perspective view. The instrument unit 2' comprises two analogue instruments 5 with pointers 19 and a display 16. The shadow region 9' is closed by side walls 17 and a wall 18 facing the driver. Because of this, no light can enter the shadow region 9' even from the sides (from positive and negative vehicle transverse direction Y).

Figure 5:
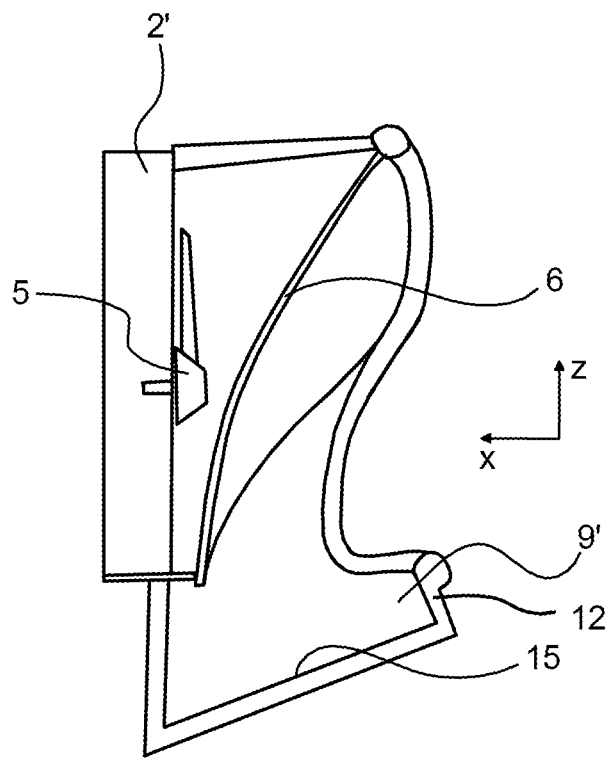
FIG. 5 is from a lateral perspective in section the speedometer housing shown in FIG. 4.

FIG. 5 shows a section through one of the instruments 5 shown in FIG. 4 from a lateral perspective. The shadow region 9' is also protected from the incidence of light even through the instrument unit 2 itself. Like the shadow region 9 shown in the FIG. 1 and FIG. 2, the shadow region 9' shown in the FIG. 3 to FIG. 5 can also have a black and mat surface 15'.

Figure 6:
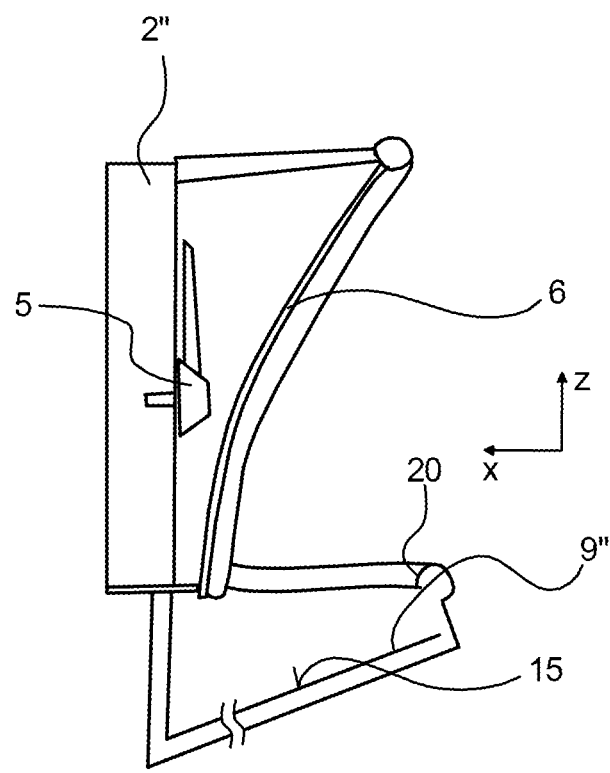
FIG. 6 is from a lateral perspective in section, a further embodiment with a shadow region, which is arranged in a separate component arranged near an instrument unit.

FIG. 6 shows a section through one of the instruments shown in FIG. 4 from a lateral perspective. In a separate assembly strip 20, a shadow region 9" is arranged. The assembly strip 20 is arranged directly in front of an instrument unit 2 with a cover 6. The cover 6 is curved in order to focus the light. The shadow region 9" is closed all around, except on the side 8' facing the instrument unit 2.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle cockpit, comprising:
   an instrument unit;
   an at least partially transparent cover arranged on the instrument unit; and
   a shadow region that is arranged relative to the at least partially transparent cover so that the shadow region is mirrored in the at least partially transparent cover seen from a driver position;
   wherein the shadow region is closed on a side facing the driver position.

2. The motor vehicle cockpit according to claim 1,
   wherein the instrument unit is arranged on an instrument panel, and
   wherein the shadow region is arranged on a steering column cover.

3. The motor vehicle cockpit according to claim 1, wherein the shadow region is arranged on the instrument unit.

4. The motor vehicle cockpit according to claim 1, wherein the shadow region is arranged on an assembly strip that is arranged in front of the instrument unit.

5. The motor vehicle cockpit according to claim 1, wherein the at least partially transparent cover is curved about a vehicle transverse axis.

6. The motor vehicle cockpit according to claim 1, wherein the at least partially transparent cover is curved about a vehicle vertical axis.

7. The motor vehicle cockpit according to claim 1, wherein the at least partially transparent cover is inclined towards the bottom.

8. The motor vehicle cockpit according to claim 1, wherein the shadow region is tinted black.

9. The motor vehicle cockpit according to claim 1, wherein the shadow region has a light-absorbing surface.

10. The motor vehicle cockpit according to claim 1, wherein the shadow region is further arranged relative to the at least partially transparent cover such that light rays from the partially transparent cover is reflected into the shadow region.

11. The motor vehicle cockpit according to claim 1, wherein the shadow region is further arranged relative to the at least partially transparent cover such that no direct light enters the shadow region.

* * * * *